(12) United States Patent (10) Patent No.: US 9,266,690 B2
Petkov et al. (45) Date of Patent: Feb. 23, 2016

(54) LIGHT POSITIONING SYSTEM AND METHOD OF USING THE SAME

(71) Applicant: Mi-Jack Products, Inc., Hazel Crest, IL (US)

(72) Inventors: Nikolay Petrov Petkov, Roselle, IL (US); Harvey E. Schmidt, Flossmoor, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 82 days.

(21) Appl. No.: 13/801,109

(22) Filed: Mar. 13, 2013

(65) Prior Publication Data

US 2014/0277688 A1    Sep. 18, 2014

(51) Int. Cl.
  *G06F 7/00* (2006.01)
  *B65G 69/00* (2006.01)
(52) U.S. Cl.
  CPC ..................... *B65G 69/00* (2013.01)
(58) Field of Classification Search
  CPC ..................................... G06Q 10/08
  USPC ........................................... 700/213
  See application file for complete search history.

(56) References Cited

U.S. PATENT DOCUMENTS

| | | |
|---|---|---|
| 2,069,236 A | 2/1937 | Fitch |
| 4,679,660 A | 7/1987 | Suzuki |
| 5,142,658 A | 8/1992 | McMorran et al. |
| 5,590,217 A | 12/1996 | Toyama |
| 5,884,238 A | 3/1999 | Noll et al. |
| 6,190,107 B1 | 2/2001 | Lanigan, Sr. et al. |
| 7,044,247 B2 | 5/2006 | Johansson et al. |
| 7,231,065 B2 | 6/2007 | Peach et al. |
| 7,720,554 B2 | 5/2010 | DiBernardo et al. |
| 2002/0027652 A1 | 3/2002 | Paromtchik et al. |

(Continued)

OTHER PUBLICATIONS

International Search Report and Written Opinion issued Sep. 5, 2014, for International Application No. PCT/US2014/021025, Applicant, Mi-Jack Products, Inc. (6 pages).

(Continued)

*Primary Examiner* — Kyle Logan
(74) *Attorney, Agent, or Firm* — McCracken & Gillen LLC (57) ABSTRACT

A light positioning system for use in transferring a container to a buffer is disclosed. The system includes a light signal that is disposed adjacent the buffer for guiding an operator to position a chassis into the buffer and a program logic controller. The system also includes a thru beam sensor. The thru beam sensor senses movement of the container into the buffer and outputs data to the program logic controller. The system further includes a distance sensor. The distance sensor determines a distance from the distance sensor to the container and outputs data to the program logic controller. The program logic controller determines a length of the container based on the data received from the thru beam sensor and the distance sensor and provides an output signal to the light signal based on the length of the container and the data received from the distance sensor.

16 Claims, 9 Drawing Sheets

(56) References Cited

U.S. PATENT DOCUMENTS

| | | |
|---|---|---|
| 2003/0191555 A1 | 10/2003 | Takehara et al. |
| 2007/0009345 A1 | 1/2007 | Hall et al. |
| 2008/0219827 A1 | 9/2008 | Lanigan et al. |
| 2008/0243301 A1* | 10/2008 | Lanigan ............ G06Q 10/08 700/214 |
| 2008/0298939 A1* | 12/2008 | Lanigan, Sr. ........ B65G 63/065 414/344 |
| 2009/0003985 A1 | 1/2009 | Lanigan et al. |
| 2009/0245990 A1* | 10/2009 | Lanigan, Sr. ........ B65G 1/0471 414/495 |
| 2011/0199099 A1 | 8/2011 | Kato et al. |
| 2011/0316720 A1 | 12/2011 | Ghatak |
| 2012/0022785 A1 | 1/2012 | DiBernardo et al. |
| 2012/0067672 A1 | 3/2012 | Nussbaum |
| 2013/0211766 A1 | 8/2013 | Rosenberg et al. |
| 2014/0268095 A1 | 9/2014 | Petkov et al. |

OTHER PUBLICATIONS

International Search Report and Written Opinion issued Jan. 29, 2015, for International Application No. PCT/US2014/063716, Applicant, Mi-Jack Products, Inc. (14 pages).

"SICK DT 60 Distance Sensor," Sensors Inc., Technical Information, Nov. 2003 (2 pages).

* cited by examiner

LIGHT POSITIONING SYSTEM AND METHOD OF USING THE SAME

FIELD OF THE INVENTION

This invention relates to a system for use in the transferring of a container.

BACKGROUND OF THE INVENTION

The shipment of goods is a complex and costly process with many actors, including shippers, manufacturers, wholesalers, and retailers. Currently, goods are placed in containers of various lengths, e.g., 20', 40', 45', 48,' and 53', for transport. The containers may be transported via a ship to a shipyard or via a train to a rail yard. From the shipyard or rail yard, the containers may then be transferred to a chassis of a tractor trailer for further shipment or distribution. Different sized chassis are available to accommodate the different sized containers.

The transfer of a container onto a chassis is presently cumbersome and time consuming. The transfer of the container requires an operator of a crane or side loader or other personnel to be present when the tractor trailer with an empty chassis arrives. If the crane operator or the driver of the tractor trailer is delayed, the driver of the tractor trailer will have to wait until the crane operator is available to load the container onto the chassis. Once the container is loaded onto the chassis, the container is transported to its next location by the tractor trailer. The next destination may be another ship yard or rail yard, a distribution center, or it may be a warehouse or retail store where the goods in the container are unloaded. In any case, the container will eventually be removed from the chassis. Again, as with loading the container onto the chassis, removing the chassis is also cumbersome and time consuming requiring both the presence of the crane operator or dock personnel and the driver of the tractor trailer.

Several systems attempt to solve the inefficiencies noted above. For example, U.S. Pat. No. 7,231,065 (Peach et al.) discloses a method and apparatus for controlling cameras and performing Optical Character Recognition of a container code and chassis code that processes containers and chassis into and out of a facility. A camera is used to determine when a truck is present within a specific gate lane in the facility. The camera is also used to determine if the truck is a Bob-tail (i.e., the tractor trailer is without a chassis or container); a bare chassis or a chassis having a container. In the latter case, the camera takes various images to determine the container's size. The container's size, along with other information, is then used to process the trucks into or out of the facility. However, the method and apparatus disclosed in Peach et al. do not provide an automated way to remove the container from the chassis or place a container onto the chassis, nor is a signaling system provided to assist the driver in positioning the chassis into the gate lane. Further, the system uses cameras to determine the size of the container, which can be costly.

U.S. Pat. No. 5,142,658 (McMorran et al.) discloses a container chassis positioning system. In this system, a light signal and camera are used to assist a driver to position the chassis at a preprogrammed stop point in a loading or unloading lane. This system, however, requires the use of a crane to unload or load a container on the chassis. Thus, a driver must still wait until a crane is free before he can drive the tractor trailer to the next location. Further, a camera is required for the positioning of the chassis, which can be expensive.

U.S. Publication No. 2008/0219827 (Lanigan et al.) discloses an inline terminal system. The system includes a buffer that includes four side latch cylinders that engage the bottom corner castings of a container. The buffer can be used to unload a container from a chassis without the assistance of a crane. However, the system does not provide a buffer that can be used with different sized containers, nor is a light signal provided that assists a driver position a chassis or container at a proper stopping position within the buffer.

U.S. Publication 2008/0219827 (Lanigan, Sr. et al.) discloses a distribution system that includes a buffer. The buffer includes movable shelves having a retracted and extended position. The system also has a chassis having a support structure that can be raised or lowered using a lift control. The support structure is used to raise a container resting on the support structure so that the container can be transferred to the buffer after the chassis and container have been positioned in the buffer. Further, the buffer includes at least one wheel guide to aid in aligning the chassis in the buffer. Although this system allows a driver to load or unload a container without the assistance of crane, it requires a chassis that is specially fitted with an elevating structure to raise and/or lower the container. Therefore, the system cannot be used with a standard chassis.

For these reasons, a system that can economically load and unload varying sized containers from a standard chassis without requiring the use of crane would be an important improvement in the art.

SUMMARY OF THE INVENTION

According to one aspect of the present invention, a buffer for transferring a container is disclosed. The buffer includes a first frame member having first and second vertical supports. A first lift beam is disposed between and attached to the first and second vertical supports. The buffer also includes a second frame member having third and fourth vertical supports. A second lift beam that is substantially parallel to the first lift beam is disposed between and attached to the third and fourth vertical supports. The first and second frame members define a channel therebetween. The buffer further includes a first set of support pads movably attached to the first lift beam and a second set of support pads movably attached to the second lift beam. A light signal is disposed adjacent the buffer and is connected to the program logic controller. A plurality of actuators is connected to each set of the support pads and the program logic controller such that the plurality of actuators is capable of moving the support pads from a first position to a second position.

According to another aspect of the present invention, a light positioning system for use in transferring a container to a buffer is disclosed. The light positioning system includes a light signal that is disposed adjacent the buffer for guiding an operator to position a chassis into the buffer and a program logic. The light positioning system also includes a thru beam sensor. The thru beam sensor senses movement of the container into the buffer and outputs data to the program logic controller. The light positioning system further includes a distance sensor. The distance sensor determines a distance from the distance sensor to the container and outputs data to the program logic controller. The program logic controller determines a length of the container based on the data received from the thru beam sensor and the distance sensor and provides an output signal to the light signal based on the length of the container and the data received from the distance sensor.

According to further aspect of the present invention, a method of transferring a container to a buffer is disclosed. The method includes the steps of sensing movement of the container carried by a chassis into the buffer using a plurality of sensors and determining a length of the container based on data received from the plurality of sensors. The method also includes the steps of guiding an operator via a light signal to position the chassis into the buffer based on the length of the container and extending a plurality of support pads associated with the buffer to an underside of the container. The method further includes the steps of raising the support pads so as to support the container and withdrawing the chassis from the buffer.

According to still further aspect of the present invention, a method of transferring a container to a chassis is disclosed. The method includes the steps of providing a buffer in which the container is positioned on a plurality of support pads associated with the buffer and sensing movement of the chassis into the buffer using a plurality of sensors. The method also includes the steps of retrieving stored data relating to the container where the stored data includes the container's length and guiding an operator via a light signal to position the chassis beneath the container. The light signal illuminates in a specific color to guide the operator based on the stored data and data received from the plurality of sensors. The method further includes the steps of lowering the plurality of support pads such that the container rests upon the chassis, retracting the plurality of support pads from under the container to a retracted position, and withdrawing the chassis carrying the container from the buffer.

DETAILED DESCRIPTION OF THE PREFERRED EMBODIMENTS

Disclosed is a light positioning system 20 for use in the transferring of a container. FIGS. 1-8 show one embodiment of the light positioning system 20, which is used to conjunction with a buffer 21, and FIGS. 9-12 show various embodiments of methods for transferring a container to or from the buffer 21 using the light positioning system 20. In general, the buffer 21 is used to temporarily store a container. The light positioning system 20 enables the container to be transferred from a chassis of a tractor trailer to the buffer 21 by an operator of the tractor trailer without the assistance of a third party. Once stored in the buffer 21, the container may then be later picked-up by a tractor trailer with a chassis that is empty. Again, the light positioning system 20 enables the operator of the tractor trailer to remove the container from the buffer 21 without the need for a third party. The container may then by transported by the tractor trailer to a destination, e.g., a warehouse.

The term "container" as used herein has its common an ordinary meaning, and can include any type of container such as an ISO container, domestic container, semi-trailer, enclosure, and the like. In addition, the terms "tractor, truck, and tractor trailer" have their generally accepted meanings and are used interchangeably. These vehicles are used to pull, carry, and/or haul containers. Further, the term "buffer" as used herein refers to a temporary storage apparatus or device.

Figure 1:
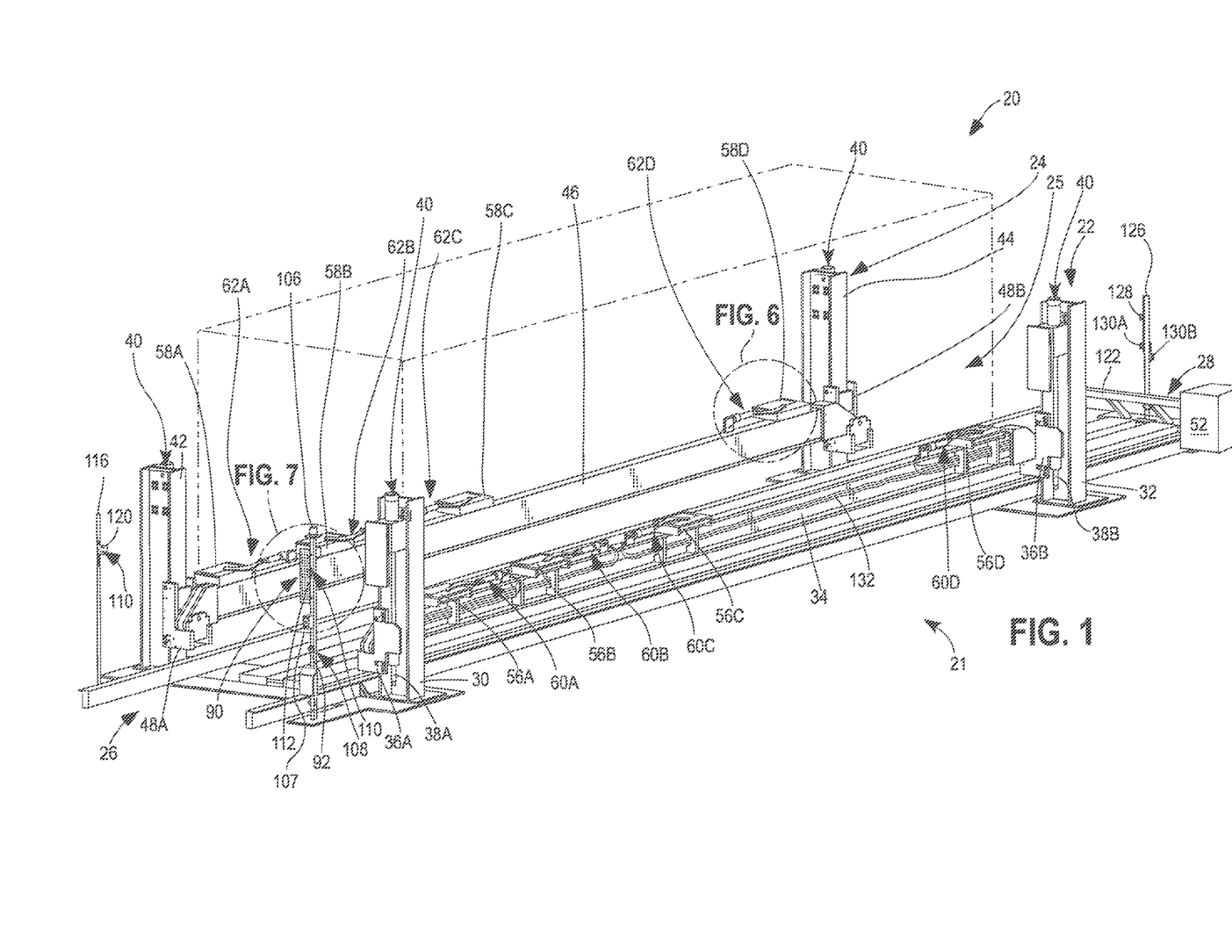
FIG. 1 is an isometric view of one embodiment of the light positioning system.

Turning to FIG. 1, the buffer 21 includes a first frame member 22 and a second frame member 24. Together, the first frame member 22 and the second frame member 24 define a channel 25. In addition, on one end of the buffer 21, is an entry 26 and at the opposite end is a rear frame 28.

The first frame member 22 includes a first vertical support 30 and a second vertical support 32. Disposed between the first and second vertical supports 30, 32 is a first lift beam 34. In one embodiment, the first lift beam 34 is attached to the first vertical support 30 and the second vertical support 32 via mounting brackets 36A and 36B, respectively. The mounting brackets 36A, 36B are movably attached to the first and second vertical supports 30, 32 so that they may slide along the vertical supports in a vertical direction. The movement of the mounting brackets 36A, 36B along the respective first vertical support 30 and the second vertical support 32 are controlled by vertical actuators 38A and 38B, respectively. In one embodiment, power is provided to the vertical actuators 38A, 38B by motors 40 that are mechanically connected to each of the vertical actuators 38A, 38B. The motors 40 may be electric motors or other type of motors such as hydraulic. A pneumatic motor may also be used without violating the scope and spirit of the invention.

The structure of the second frame member 24 is similar to the first frame member 22 and includes a first vertical support 42 and a second vertical support 44. Vertical supports 30, 32, 42, 44 may be secured to the ground in any fashion known in the art such as anchor bolts or similar device. A second lift beam 46, which is a mirror image of the first lift beam 34, is disposed between the first and second vertical supports 42, 44 of the second frame member 24 and is substantially parallel to the first lift beam 34. Mounting brackets 48A and 48B are movably attached to the first vertical support 42 and the second vertical support 44, respectively. Mounting brackets 48A, 48B are mechanically connected to vertical actuators 50A (not shown) and 50B (see FIG. 5), and can move vertically along the first and second vertical supports 42, 44 via the vertical actuators 50A and 50B. In one embodiment, power is provided to the vertical actuators 50A, 50B by motors 40 that are mechanically connected to each of the vertical actuators 50A, 50B. In another embodiment, a single motor is utilized that provides power to the vertical actuators 38*a*, 38B and 50A, 50B. The vertical actuators 38A, 38B and 50A, 50B may be motorized screws, hydraulic cylinders or any other similar device known in the art. In the case of a motorized screw, the motor may be electric, hydraulic, or pneumatic.

The motors 40 are electronically connected to the program logic controller ("PLC") 52. The PLC 52, which is discussed in further detail below, controls the movement of the first lift beam 34 and the second lift beams 46 along the vertical supports 30, 32, and 42, 44. More specifically, the PLC 52 controls via the motors 40 the vertical actuators 38A, 38B and 50A, 50B, which move the mounting brackets 36A, 36B of the first lift beam 34 and the mounting brackets 48A, 48B of the second lift beam 46. In one embodiment, the PLC 52 is disposed adjacent the rear frame 28. The vertical actuators 38A, 38B and 50A, 50B are directed by the PLC 52 to raise the first and second lift beams 34 and 46 via the mounting brackets 36A, 36B and 48A, 48B, respectively, when a chassis carrying a container reaches its final stopping distance as described in the discussion of FIG. 8 below. Likewise, when an empty chassis enters the buffer 21 to pick up a container, the PLC 52 directs the vertical actuators 38A, 38B and 50A, 50B to lower the first and second lift beams 34 and 46 via the mounting brackets 36A, 36B and 48A, 48B, respectively.

Figure 2:
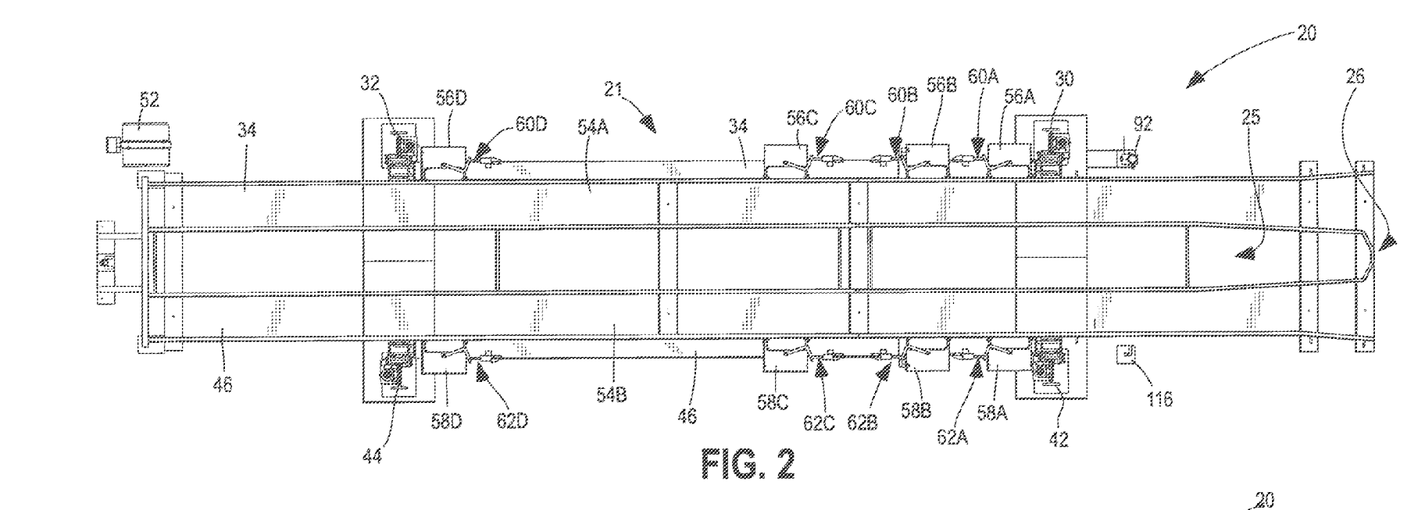
FIG. 2 is a top plan view of the light positioning system of FIG. 1.

As best shown in FIG. 2, the buffer 21 includes two guide tracks 54A and 54B. The guide tracks 54A, 54B are disposed between the first frame member 22 and the second frame member 24 and are substantially parallel to each other. Guide tracks 54A, 54B are provided to guide the wheels of a chassis into the buffer 21. Guide tracks 54A, 54B may be secured to the ground in any manner know in the art such as anchor bolts or similar device and may be welded to the base plates of the first frame member 22 and the second frame member 24.

Figure 3:
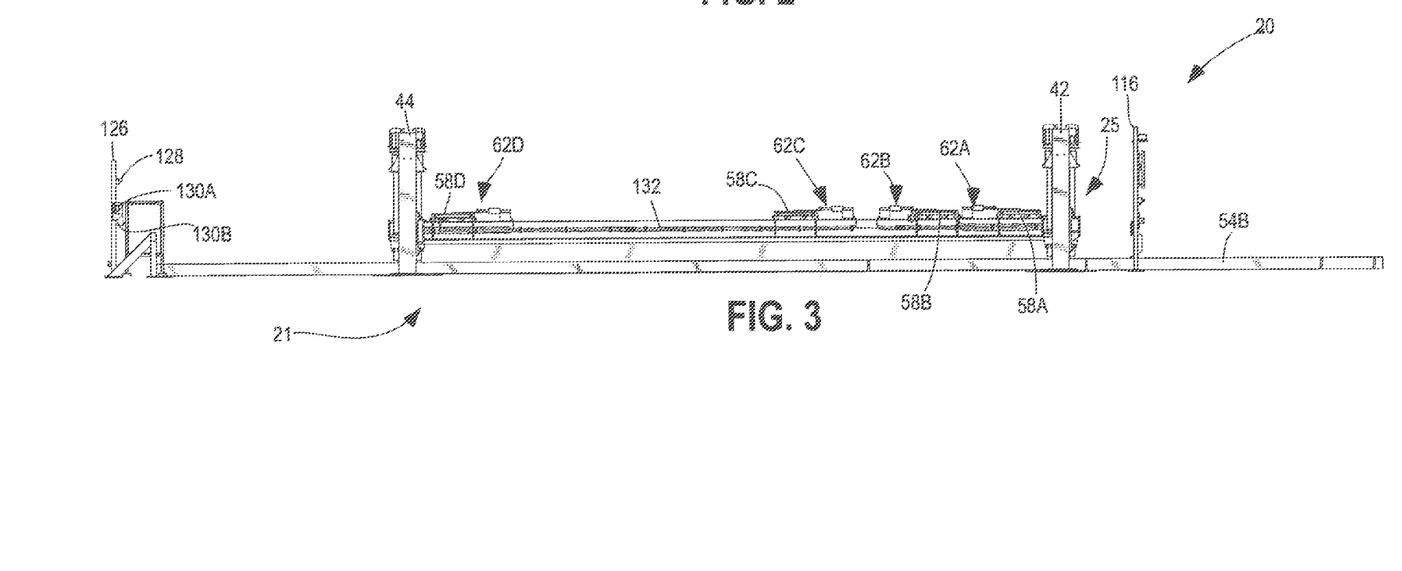
FIG. 3 is a left side elevational view of the light positioning system of FIG. 1.

As shown in FIGS. 1-3, four support pads 56A, 56B, 56C, and 56D are spaced apart and movably attached to the first lift beam 34. In addition, four support pads 58A, 58B, 58C, and 58D are spaced apart and movably attached to the second lift beam 46. Each of the support pads 56A-D corresponds to one of the support pads 58A-D. For example, the support pad 56A is located across from the support pad 58A and both support pads 56A and 58A are located at the substantially same point along the first lift beam 34 and the second lift beam 46, respectively (see FIGS. 2 and 3). Further, six of the eight support pads (56A-C and 58A-C) are located substantially proximate the first vertical supports 30 and 42 of the first and second frame members 22 and 24, respectively, and the remaining two support pads (56D and 58D) are located proximate the second vertical supports 32 and 44 of the first and second frame members 22 and 24, respectively.

Attached to each of the support pads 56A, 56B, 56C, and 56D and the first lift beam 34 are support pad actuators 60A, 60B, 60C, 60D, respectively. Similarly, attached to each of the support pads 58A, 58B, 58C, 58D and the second lift beam 46 are support pad actuators 62A, 62B, 62C, 62D, respectively. Although eight support pads are shown in total, any number of support pads 56 and 58 and corresponding support pad actuators 60 and 62, respectively, may be included as long as enough pads are provided to adequately support containers of various sizes. In one embodiment, as shown in Table 1 below, the number of support pads 56, 58 used for a 20' container is four, and the number of support pads 56, 58 used for a 40'-53' container is six. Table 1 also identifies the specific support pads used to support a container of a particular size in this embodiment.

TABLE 1

| Container Size | Number of Support Pads | Specific Support Pads |
| --- | --- | --- |
| 20' | 4 support pads | 56A, 56C and 58A, 58C |
| 40' | 6 support pads | 56B, 56C, 56D and 58B, 58C, 58D |
| 45' | 6 support pads | 56B, 56C, 56D and 58B, 58C, 58D |
| 48' | 6 support pads | 56B, 56C, 56D and 58B, 58C, 58D |
| 53' | 6 support pads | 56B, 56C, 56D and 58B, 58C, 58D |

Figure 4:
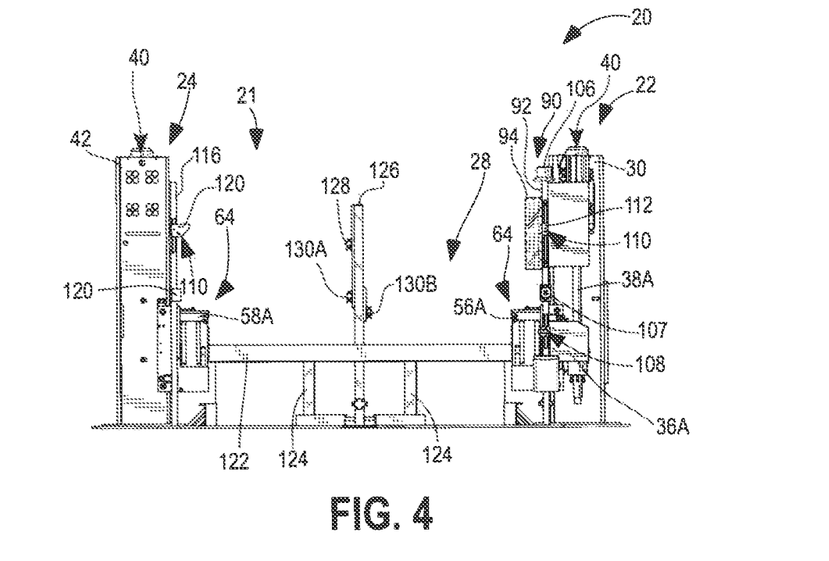
FIG. 4 is a front elevational view of the light positioning system of FIG. 1.
Figure 5:
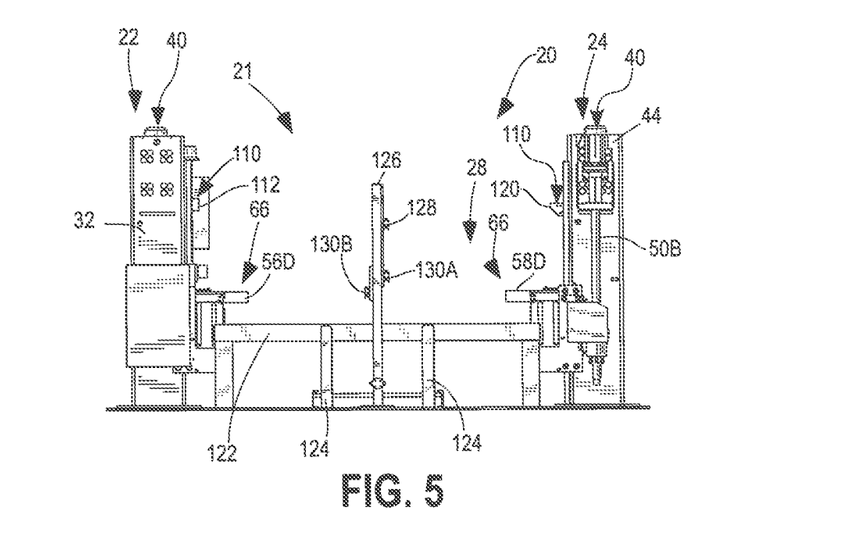
FIG. 5 is a rear elevational view of the light positioning system of FIG. 1.

The support pad actuators 60A-D and 62A-D are electronically connected to the PLC 52. The PLC 52 controls the horizontal movement of the support pads 56A-D and 58A-D via the support pad actuators 60A-D and 62A-D, respectively. The support pads 56A-D and 58A-D may be moved from a first position 64 to a second position 66. In one embodiment, the first position 64 may be a retracted position as shown in FIG. 4 and the second position 66 may be an extended position as shown in FIG. 5. In another embodiment, the first position 64 may be the extended position (see FIG. 5) and the second position 66 may be the retracted position (see FIG. 4).

When in the extended position 66, the support pads 56 and 58 are positioned under the underside of the container. The support pads 56A-D are moved from the retracted position 64 to the extended position 66 when a container is positioned in the buffer 21 for storage. The support pads 56A-D are moved from the first position 64 (extended position) to the second position (retracted position) 66 when a container has been placed on an empty chassis for transport. Corresponding supports pads may be moved separately or in groups. For example, in one embodiment, the support pads 56A and 58A may be moved from the first position 64 to the second position 66 simultaneously along with any of 56B and 58B, 56C and 58C, and 56D and 58D. However, in this embodiment the support pads are typically moved in groups of opposing pairs such as shown in Table 1. In this manner, all containers of the typical container lengths shown in Table 1 can be handled by the buffer 21

Figure 6:
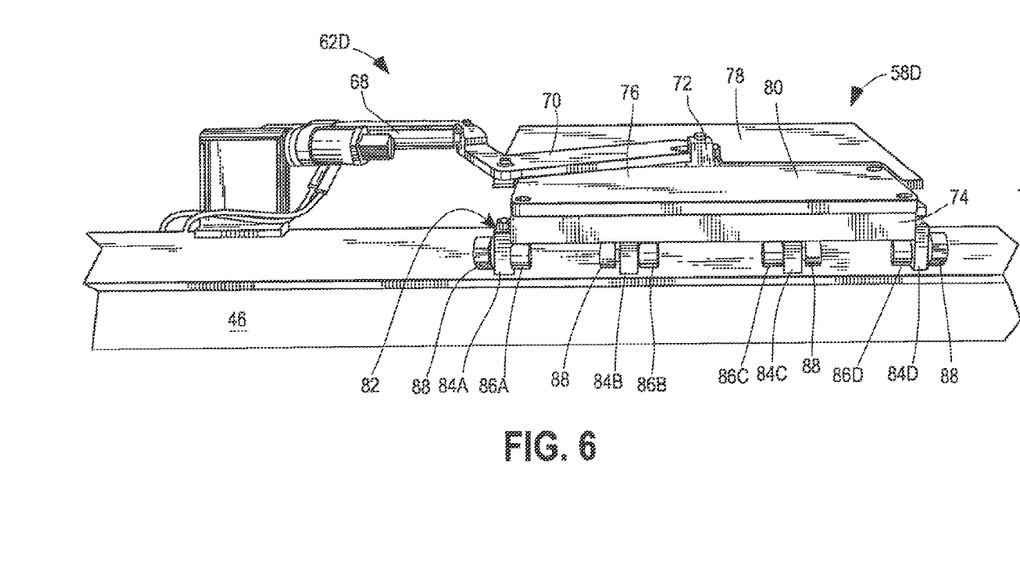
FIG. 6 is a enlarge view of a support pad as shown in FIG. 1.

FIG. 6 shows an enlarged view of the support pad 58D and support pad actuator 62D in a default retracted position. All of the support pads 56A-D, 58A-D and support pad actuators 60A-D, 62A-D contain the same components with the only difference being the side upon which the actuator is positioned relative to the support pad. Accordingly, detail will only be provided with regard to support pad 58D and support pad actuator 62D. In one embodiment, the support pad actuator 62D comprises an electric linear actuator 68 and a linkage assembly 70. The linkage assembly 70 is attached to the support pad 58D via a protrusion 72. The support pad 58D comprises a lower portion 74, a first upper portion 76, and a second upper portion 78. In one embodiment, the lower portion 74 and the second upper portion 78 each comprise a steel plate, and the first upper portion 76 includes a slip pad 80. The slip pad 80 contacts the underside surface of the container to prevent slipping of the container when the container is being transferred to or from a tractor trailer. The slip pad 80 may be made of urethane or any similar material. The support pad 58D is bordered on its left side, rear, and right side by a support pad frame 82. In one embodiment, the support pad frame 82 contains four support bars 84A, 84B, 84C and 84D, which are fixedly attached to the second lift beam 46, in this example. The support pad frame 82 also includes four movable rollers 86A, 86B, 86C, and 86D, which are attached to the support bars 84A, 84B, 84C, and 84D, respectively, with fasteners 88. The underside of the lower portion 74 of the support pad 58D rests upon the rollers 86A-D and engages the rollers 86A-D when the support pad 58D is moved from the first position 64 to the second position 66 and vice versa.

Figure 7:
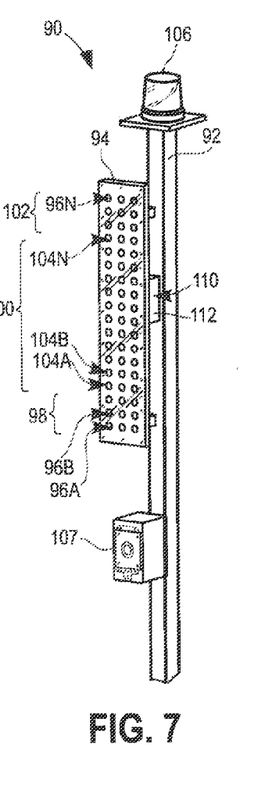
FIG. 7 is a enlarged view of a signal light as shown in FIG. 1.

Near the entry 26 of the buffer 21 adjacent the first vertical support 30 of the first frame member 22, is a light signal 90 of the light positioning system 20 (see FIGS. 1, 2, and 7). The light signal 90 is attached to a light post 92 and electrically connected to the PLC 52. The light signal 90 guides the operator of a tractor trailer into the buffer 21 by providing a visual indication of the chassis' position within the buffer 21. As best shown in FIGS. 4, 5, and 7, the light signal 90 comprises a light bar 94. The light bar 94 contains multiple rows of lights 96 A, B, . . . N. In one embodiment, a display (not shown) may be provided adjacent the light bar 94 that includes text that explains the light coloring system. In one embodiment, LED lights are used. However, any type of illumination device known in the art may be used such as incandescent light bulbs. The light bar 94 is comprised of a first set of lights 98, a second set of lights 100, and a third set of lights 102. The first set of lights 98 is comprised of green LEDs. The second set of lights 100 is comprised of yellow LEDs, and the third set of lights 102 is comprised of red LEDs. The second set of lights 100 further includes light subsets 104A, B, . . . N. The light subsets 104A, B, . . . N are each comprised of at least one row of yellow LEDs. The use of green, yellow, and red LEDs is preferred because these specified colors are generally understood by all vehicle operators to mean "go" or "maintain speed," "slow-down" or "reduce speed," and "stop," respectively.

Disposed on the top of the light post 92, is a warning light 106. In one embodiment, the warning light 106 emits a blinking red light. The warning light 106 can be of any size, but should be large enough to be easily seen by the operator of the tractor trailer in the side and/or the rear view mirrors of the tractor trailer. In addition, disposed on the lower portion of the light post 92, below the light bar 94 is an emergency stop button 107. The emergency stop button 107 can be pressed by an operator to immediately stop the light positioning system 20 at any point in time.

The light position system 20 also includes a chassis sensor 108 and a thru beam sensor 110. The chassis sensor 108 and the thru beam sensor 110 are also located near the entry 26 of the buffer 21. The chassis sensor 108 senses movement of an object, i.e., a chassis, into the buffer 21. Similarly, the thru beam sensor 110 senses movement of an object, i.e., a container, into the buffer 21 and is used to determine the length L of the container.

The chassis sensor 108 may be an ultrasonic sensor. The thru beam sensor 110 is comprised of separate receiver and emitter portions. In one embodiment, a thru beam sensor receiver 112 is attached to the light post 92. As best shown in FIG. 7, the thru beam sensor receiver is attached to the light post 92 behind the light bar 94. Substantially aligned with the light post 92 and disposed adjacent the first vertical support 42 of the second frame member 24 is an emitter post 116. Attached to the emitter post 116 is a thru beam sensor emitter 120. The thru beam receiver 112 and the thru beam sensor emitter 120 together form the thru beam sensor 110 and are located at a height on the light post 92 and the emitter post 116, respectively, that enables the thru beam sensor 110 to sense a container of any length that is entering the buffer 21. Further, the thru beam 110 may be a through-beam laser or a photo electric sensor or other emitter and receiver device.

The rear frame 28 of the light positioning system 20, as shown in FIGS. 1, 4, and 5, includes a cross bar member 122 and rear support members 124. Located at a distance from the rear frame 28 is a distance sensor post 126. Attached to the distance sensor post 126 are a container distance sensor 128 and chassis distance sensors 130A and 130B. The distance sensor post 126 is shown disposed at a point that is substantially centered between the first frame member 22 and the second frame member 24. Although a centered position is preferred, the distance sensor post 126 may be disposed at any point between the first and second frame members 22 and 24 that enables an unobstructed viewpoint from the container distance sensor 128 or the chassis distance sensors 130A, 130B to a container or chassis.

The container distance sensor 128 measures the distance from the container distance sensor 128 to a container. The chassis distance sensor 130A is used to measure the distance from the chassis distance sensor 130A to a chassis that is 20' in length. The chassis distance sensor 130B is used to measure the distance from the chassis distance sensor 130B to a chassis that is 40', 45', 48', or 53' in length. All the distance sensors 128 and 130A, 130B are electronically connected as inputs to the PLC 52.

The container distance sensor 128 and the chassis distance sensors 130A, 130B comprise a single unit and include both emitter and receiver portions. For example, in one embodiment, the container distance sensor 128 and the chassis distance sensors 130A, 130B may comprise a laser system such as a DT series distance sensor that is commercially available under the trademark SICK™. The container distance sensor and the chassis distance sensor may also be other suitable proportional distance sensing devices. In use, the container distance sensor 128 and the chassis distance sensors 130A, 130B of the light positioning system 20 measure the time it takes for an emitted beam to reflect off an object (e.g., a container or a chassis) and return to the receiver portion of the distance sensor. The time measurement is then converted into a distance measurement signal that is proportional to the distance from the distance sensor to the object. This distance measurement signal is then sent to the PLC 52.

Power can be provided to the electrical components of the light positioning system 20 including the motors 40, the vertical actuators 38A, 38B and 50A, 50B, the PLC 52, the support pad actuators 60A-D, 62A-D, the light signal 90, the light bar 94, the various lights 98, 100, 102, and 106, and the multiple sensors 108, 110, 128, and 130, through a standard power grid or with a stand alone engine driven electric generator. Wires 132 may run along the outer portion of the first lift beam 34 and the second lift beam 46 to connect the aforementioned components to the power source.

Figure 9:
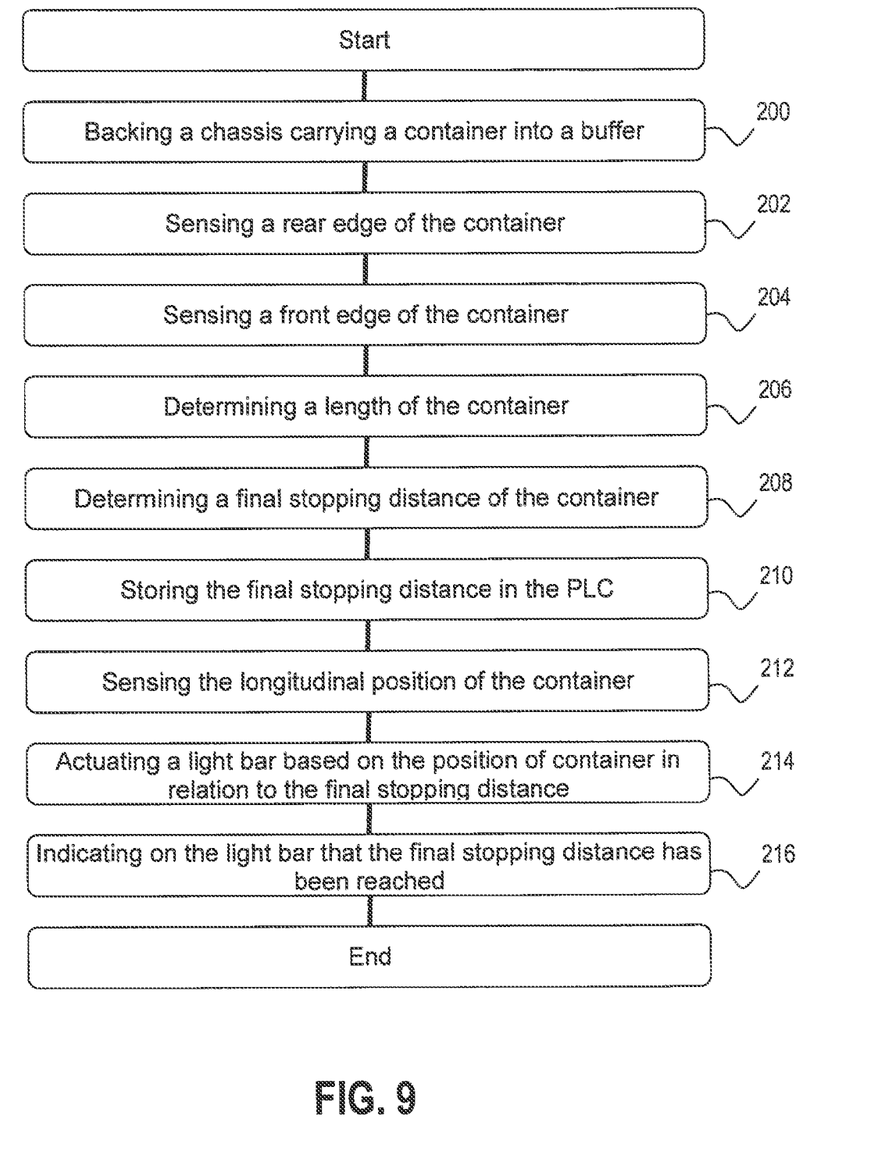
FIG. 9 is a flow chart of one embodiment of a method of transferring a container using the light position system of FIG. 1.

Also disclosed are methods for transferring a container using the light positioning system 20. As shown in FIG. 9, one embodiment of a method of transferring a container includes the steps of backing a chassis with a container into a buffer 200; sensing a rear edge of the container 202; sensing a front edge of the container 204; determining a length of the container 206; determining a final stopping distance of the container 208; storing the final stopping distance in the PLC 210; sensing the longitudinal position of the container 212; actuating a light bar based on the position of container in relation to the final stopping distance 214; and indicating on the light bar that the final stopping distance has been reached 216.

Figure 10:
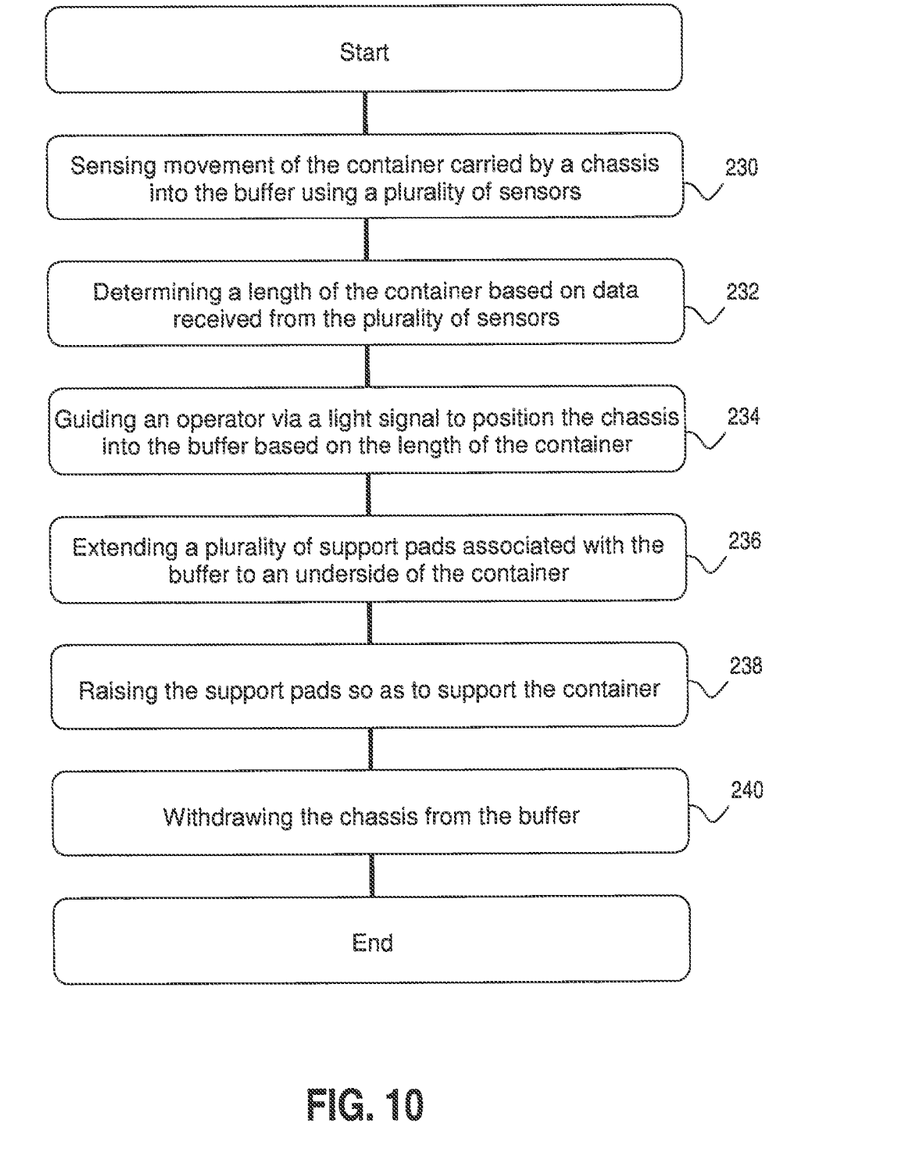
FIG. 10 is a flow chart of another embodiment of a method of transferring a container using the light positioning system of FIG. 1.

As shown in FIG. 10, another embodiment of a method of transferring a container includes the steps of sensing movement of the container carried by a chassis into the buffer using a plurality of sensors 230; determining a length of the container based on data received from the plurality of sensors 232; guiding an operator via a light signal to position the chassis into the buffer based on the length of the container 234; extending a plurality of support pads associated with the buffer to an underside of the container 236; raising the support pads so as to support the container 238; and withdrawing the chassis from the buffer 240.

Figure 11:
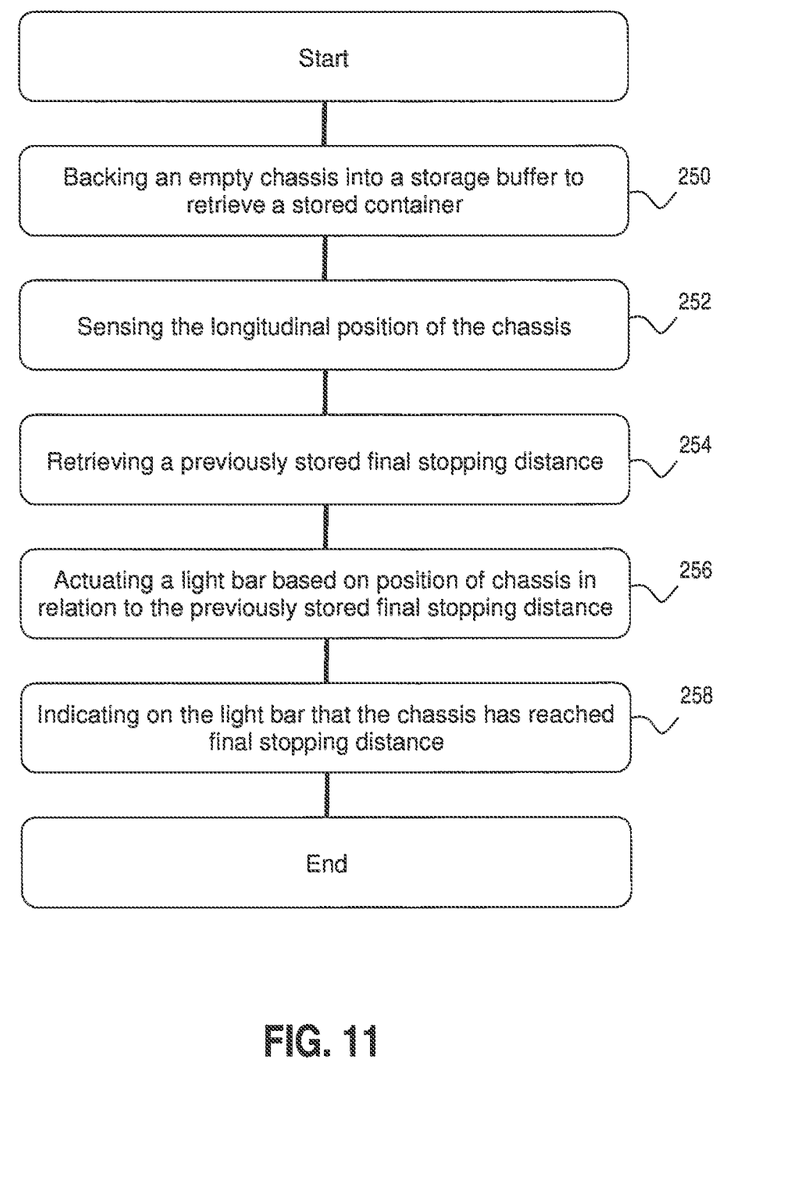
FIG. 11 is a flow chart of a further embodiment of a method of transferring a container using the light position system of FIG. 1.

FIG. 11 discloses a further embodiment of a method of transferring a container including the steps of backing an empty chassis into a storage buffer to retrieve a stored container 250; sensing the longitudinal position of the chassis 252; retrieving a previously stored final stopping distance 254; actuating a light bar based on position of chassis in relation to the previously stored final stopping distance 256; indicating on the light bar that the chassis has reached final stopping distance 258.

Figure 12:
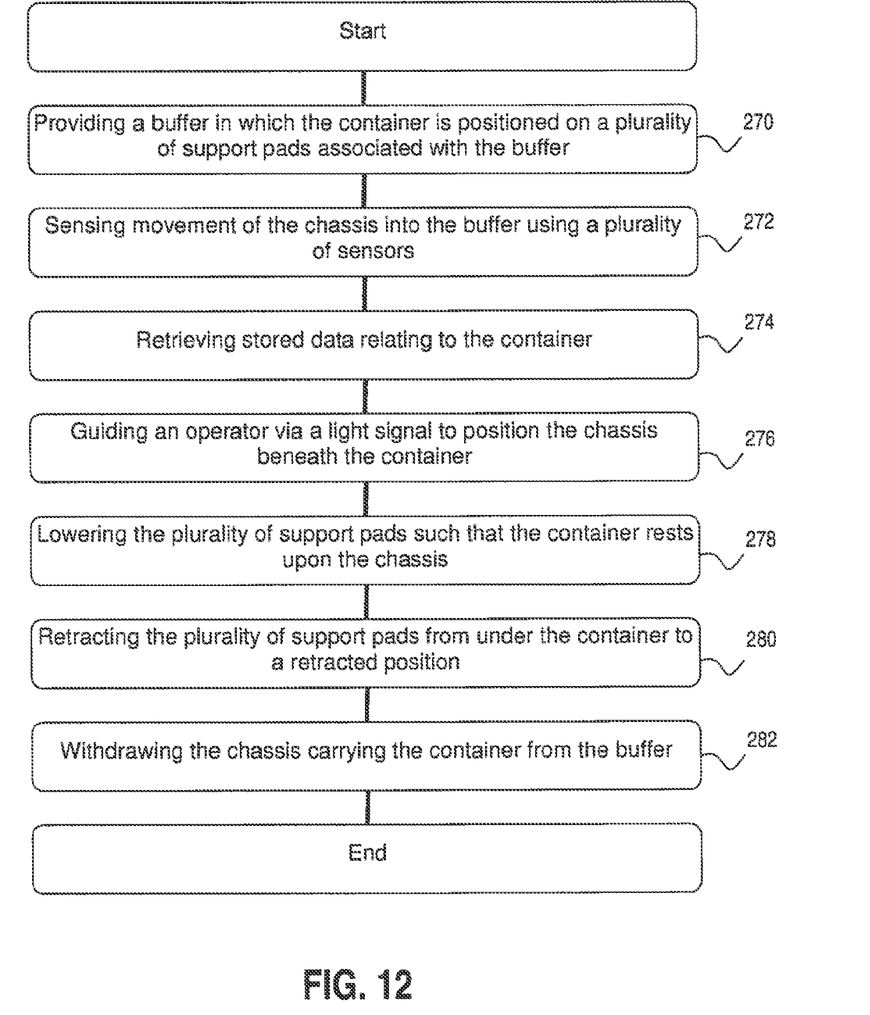
FIG. 12 is a flow chart of a still further embodiment of a method of transferring a container using the light position system of FIG. 1.

A still further embodiment of a method of transferring a container is shown in FIG. 12 and is comprised of the steps of providing a buffer in which the container is positioned on a plurality of support pads associated with the buffer 270; sensing movement of the chassis into the buffer using a plurality of sensors 272; retrieving stored data relating to the container, wherein the stored data includes the container's length 274; guiding an operator via a light signal to position the chassis beneath the container, wherein the light signal illuminates in a specific color to guide the operator based on the stored data and data received from the plurality of sensors 276; lowering the plurality of support pads such that the container rests upon the chassis 278; retracting the plurality of support pads from under the container to a retracted position 280; and withdrawing the chassis carrying the container from the buffer 282.

In operation, when a container 134 is to be transferred from a chassis 136 to the buffer 21, the operator of a tractor trailer unfastens the container 134 from the chassis 136 before entering the buffer 21 so that the container 134 can be freely removed from the chassis 136 by the buffer 21. Because the chassis 136 will be moving at a slow speed (i.e., <5 mph) into the buffer 21, there is little risk of the container 134 shifting to an improper position on the chassis 136 or falling off the chassis. Once the container 134 is unfastened, the operator begins to back the tractor trailer into the buffer 21. The wheels of the chassis engage the guide tracks 54A and 54B near the entry 26. The guide tracks 54A, 54B guide the chassis 136 into the buffer 21 in a relatively straight line thereby preventing the chassis 136 from moving into the buffer 21 at an improper angle.

When the chassis sensor 108 senses an object (e.g., a chassis) entering the bay, the container distance sensor 128 is activated and a data signal, which includes a measurement of the distance from the container distance sensor 128 to the container, is sent to PLC 52. When the rear edge of the container 134 breaks the through-beam laser of the thru beam sensor 110, the data signal from the container distance sensor 128 is interrupted at the PLC 52. When the front edge of the container 134 passes the thru beam sensor 110 at point A (see FIG. 8), the distance measurement from the container distance sensor 128 to the container 134 is reestablished at the PLC 52.

Figure 8:
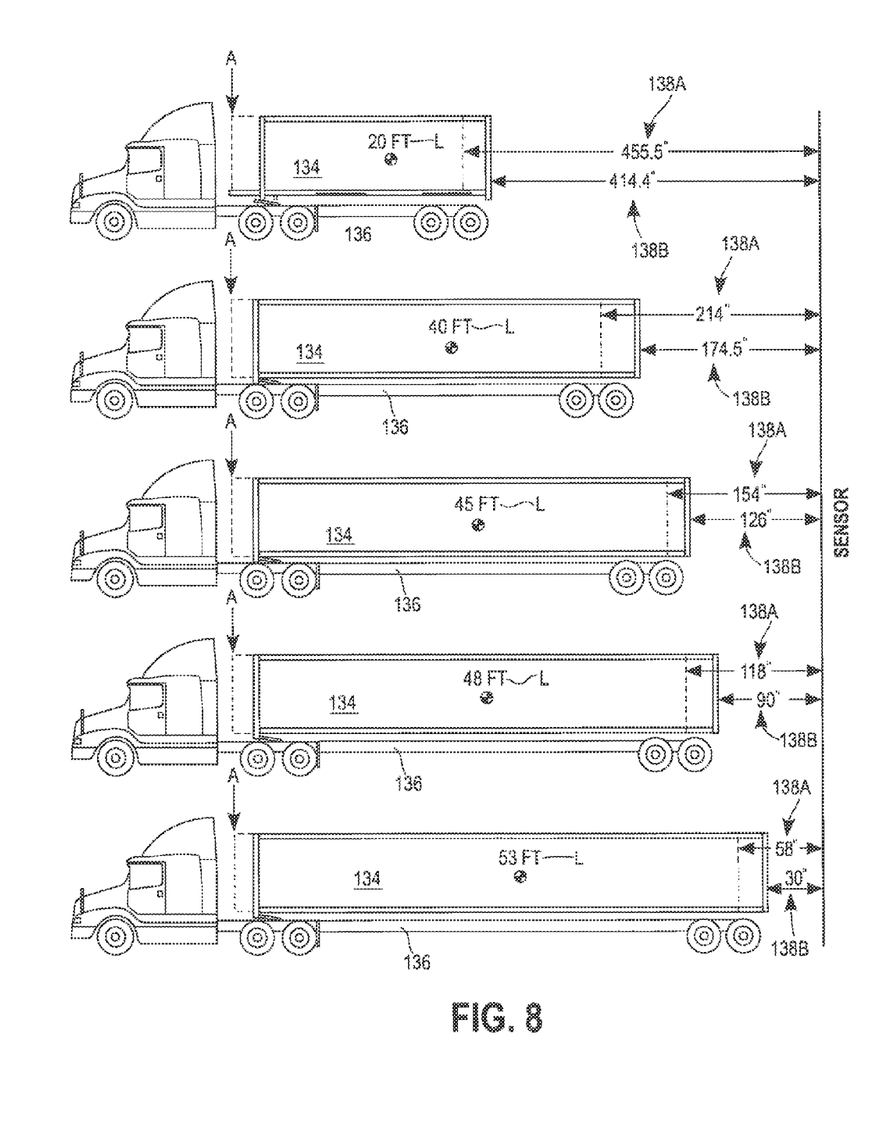
FIG. 8 is a diagram showing final stopping distances associated with various sized containers.

Each container of a particular length L has a corresponding final stopping distance 138B. The final stopping distance 138B of each container length L is stored in the PLC 52 prior to use. As shown in FIG. 8, for example, the final stopping distance 138B for a 20' container is 414.4 inches, the final stopping distance 138B for a 40' container is 174.5 inches, the final stopping distance 138B for a 45' container is 126 inches, the final stopping distance 138B for a 48' container is 90 inches, and the final stopping distance 138B for a 53' container is 30 inches.

Also shown in FIG. 8 is the point at which the through-beam laser of the thru beam sensor 110 is reestablished. The through-beam laser of the thru beam sensor 110 is reestablished at a point A for all the different container lengths L. At the point A, each of the containers 134 is a particular distance 138A from the container distance sensor 128. For example, in an embodiment, at the point A, the 20' container is a distance of 455.5 inches from the container distance sensor 128, the 40' container is 214 inches from the container distance sensor 128, the 45' container is 154 feet from the container distance sensor 128, the 48' container is 118 inches from the distance sensor 128, and the 53' container is 58 inches from the container distance sensor 128. These distances 138A are stored in the PLC 52 prior to use. Therefore, once the container distance sensor 128 is activated by the reestablishment of the through-beam laser of the thru beam sensor 110 at point A, the distance measured from the container distance sensor 128 to the container 134 when the container is at Point A is used by the program logic of the PLC 52 to determine the length L of the container, which is recorded and stored in the PLC 52. The light positioning system 20 via the PLC 52 then uses the container length measurement along with the corresponding final stopping distance 138B to guide the operator of the chassis 136 into the buffer 21.

The data the PLC 52 receives from the container distance sensor 128 is used to direct the light signal 90 to illuminate a particular set of LEDS. More specifically, when the container 134 initially enters the buffer 21 the light signal 90 is activated by the PLC 52 and illuminates the first set of lights 98 (i.e., green LEDs) on the light bar 94. Once the container length L and the final stopping distance 138B are determined, illumination of the light bar 94 progresses to the second set of lights 100 (i.e., yellow LEDS). The container distance sensor 128 continues to send data regarding the distance measurements to the PLC 52 as the container 134 moves from point A, the point in which the through-beam laser of the thru beam sensor 110 is reestablished, to a position deeper within the buffer 21 (i.e., a point closer to the rear frame 28). Thus, based on continued input from the container distance sensor 128, the PLC 52 directs the light signal 90 to illuminate the light subsets 104A, B, . . . N of the second set of lights 100. The light subsets 104A, B, . . . N illuminate in a progressive manner up the light bar 94 (see FIG. 7). This illumination progression will continue until the container reaches its final stopping distance 138B. When the final stopping distance 138B is reached based on measurements obtained from the container distance sensor 128, the PLC 52 instructs the light signal 90 to illuminate the third set of lights 102 (e.g., red LEDs). The third set of lights 102 on the light bar 94 emits a steady red light. If the operator continues to back the chassis into the buffer 21 so that the final stopping distance 138B is surpassed, the red LEDs 102 will flash, thereby signaling to the operator that the chassis has gone too far. By illuminating different sets and subsets of lights along the light bar 94, the light signal 90 of the light positioning system 20 guides the operator of the tractor trailer to position a container within the buffer 21.

Once the final stopping distance 138B is reached and the container 134 carried by the chassis 136 is no longer moving, the PLC 52 instructs specific support pads 56 and 58 to move from the default retracted position (first position) 64 to the extended position (second position) 66. As shown in Table 1, in one embodiment, support pads 56A, 56C and 58A, 58C will be moved from the retracted position 64 to the extended position 66 if for example, a 20' container is in the buffer 21. Once the appropriate selection of support pads 56 and 58 are in the extended position 66, the PLC 52 instructs the motors 40 to raise the first and second lift beams 34 and 46, respectively, from a default starting position, which is lower than any chassis or chassis/container combination, to a pre-programmed height that is appropriate for the container's size. Further, the first and second lift beams 34 and 46, respectively, will raise the container 134 to a height that is higher than that of the chassis 136, to enable the chassis 136 to be easily withdrawn from the buffer 21 and prevent the chassis 136 from coming into contact with the underside of the container 134 as the chassis 136 is moved out of the buffer 21. Once the container 134 has been lifted off of the chassis 136, the empty chassis 136 is withdrawn from the buffer 21 by the operator.

As shown in FIGS. 11 and 12, when the container 134 is to be transferred from the buffer 21 to an empty chassis, the light positioning system 20 works in substantially the same manner. The wheels of the chassis 136 engage the guide tracks 54 as the tractor trailer is backed into the buffer 21 by the operator. As noted above, the length L of the container 134, which was previously transferred to the buffer 21, was recorded and stored in the PLC 52. The stored container length L and the corresponding final stopping distance 138B provides the necessary data for the light positioning system 20 to guide an operator of the tractor trailer into the buffer 21 to pick-up the container 134.

When the empty chassis 136 passes through the entry 26, the light signal 90 and the chassis sensor 108 are activated. In this configuration, the thru beam sensor 110 is not used because the container length L is already known. In addition, the container distance sensor 128 is not used. Rather, one of the chassis distance sensor 130A and the chassis distance sensor 130B is used to provide data relating to the movement of the chassis 136 into the buffer 21 to the PLC 52, which in turn provides a signal to the light signal 90. As noted above, the chassis distance sensor 130A is used for a container having a length of 20', and the chassis distance sensor 130B is used for a container having length of 40', 45', 48'; or 53'. Two chassis distance sensors 130A and 130B are required because the 20' chassis are generally higher off the ground than chassis for 40'-53' containers. The PLC 52 instructs either the chassis distance sensor 130A or the chassis distance sensor 130B to be activated based on the stored container length L. Similar to when the container 134 is being transferred to the buffer 21, when a chassis 136 is being positioned in the buffer 21 to pick up the container 134, the light signal 90 guides the operator. Based on the measured distance of the chassis 136 from its current position to its final stopping position 138B, the PLC 52 will instruct the light signal 90 to illuminate the first, second, or third set of lights 98, 100, 102, respectively, and the light subsets 104A, B, . . . N in the same manner as discussed above with regard to the transferring of the container 134 from the chassis 136 to the buffer 21.

When the final stopping distance 138B is reached, the PLC 52 directs the motors 40 to lower the first and second lift beams 34 and 46, respectively, to a default height that is sufficiently low to clear the chassis 136. As the container 134 is lowered onto the chassis 136, the motors 40 continue to lower the first and second lift beams 34 and 46, respectively, until the default starting position is reached. When the default starting position of the first and second lift beams 34 and 46, respectively, is reached, the PLC 52 directs the support pads 56 and 58 that were previously extended to move from the extended position 66 to the default retracted position 64. After the support pads 56 and 58 have been retracted, the operator may then withdraw the chassis carrying the container from the buffer 21. The operator must secure the chassis 136 to the container 134 for transport after withdrawing the chassis 136 and the container 134 from the buffer 21.

The above light positioning system 20 can also be used in conjunction with an overhead crane. In this embodiment, an overhead crane places a container onto the buffer 21. The first and second lift beams 34 and 46 are in a raised position and the proper support pads 56A-D and 58A-D, which are determined based on the container's length, are in an extended position to accept the container. A guidance system on the overhead crane positions the container into the correct position on the lift beams 34 and 46 so that the container can be lowered properly onto an empty chassis as described above.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

We claim:
1. A buffer for transferring a container, the buffer comprising:
a first frame member having first and second vertical supports, wherein a first lift beam is disposed between and attached to the first and second vertical supports;
a second frame member having third and fourth vertical supports, wherein a second lift beam, substantially parallel to the first lift beam, is disposed between and attached to the third and fourth vertical supports, and wherein the first and second frame members define a channel therebetween;
a first set of support pads movably attached to the first lift beam;
a second set of support pads movably attached to the second lift beam;
a plurality of sensors connected to a program logic controller;
a light signal adjacent the buffer and electrically connected to the program logic controller wherein the light signal guides an operator to position a chassis at a desired location within the channel; and
a plurality of actuators connected to each set of the support pads and the program logic controller, said plurality of actuators capable of moving the support pads from a first position to a second position.

2. The buffer of claim, wherein the plurality of actuators is disposed on each of the first and second lift beams.

3. The buffer of claim 1, wherein a pair of guide tracks is disposed between the first and second frame members so as to guide wheels of a chassis into the buffer.

4. The buffer of claim 1, wherein the light signal emits a steady red light when the desired location is reached.

5. The buffer of claim 1, wherein the desired location is determined by the length of the container.

6. The buffer of claim 1, wherein movement of one of the chassis and container into the channel activates the light signal.

7. A buffer for transferring a container, the buffer comprising:
a first frame member having first and second vertical supports, wherein a first lift beam is disposed between and attached to the first and second vertical supports;
a second frame member having third and fourth vertical supports, wherein a second lift beam, substantially parallel to the first lift beam, is disposed between and attached to the third and fourth vertical supports, and wherein the first and second frame members define a channel therebetween;
a first set of support pads movably attached to the first lift beam;
a second set of support pads movably attached to the second lift beam;
a plurality of sensors connected to a program logic controller wherein the plurality of sensors includes a chassis sensor, a thru beam sensor, and a distance sensor;
a light signal adjacent the buffer and electrically connected to the program logic controller; and
a plurality of actuators connected to each set of the support pads and the program logic controller, said plurality of actuators capable of moving the support pads from a first position to a second position.

8. The buffer of claim 7, wherein the chassis sensor is disposed at an entry of the buffer and senses movement of a chassis into the buffer.

9. The buffer of claim 7, wherein the thru beam sensor is disposed at an entry of the buffer.

10. The buffer of claim 7, wherein the distance sensor is disposed between the first and second frame members at a position opposite an entry to the buffer and senses movement of an object into the buffer.

11. The buffer of claim 10, wherein the object is one of a chassis and a container.

12. The buffer of claim 10, wherein the distance sensor is a laser system.

13. A buffer for transferring a container, the buffer comprising:
- a first frame member having first and second vertical supports, wherein a first lift beam is disposed between and attached to the first and second vertical supports;
- a second frame member having third and fourth vertical supports, wherein a second lift beam, substantially parallel to the first lift beam, is disposed between and attached to the third and fourth vertical supports, and wherein the first and second frame members define a channel therebetween;
- a first set of support pads movably attached to the first lift beam;
- a second set of support pads movably attached to the second lift beam;
- a plurality of sensors connected to a program logic controller wherein the program logic controller determines a length of the container based on data from the plurality of sensors;
- a light signal adjacent the buffer and electrically connected to the program logic controller; and
- a plurality of actuators connected to each set of the support pads and the program logic controller, said plurality of actuators capable of moving the support pads from a first position to a second position.

14. The buffer of claim 13, wherein selected pads of each of the first and second sets of support pads move from the first position to the second position based on the length of the container.

15. The buffer of claim 14, wherein the selected pads of each of the first and second sets of support pads extend under the container.

16. A buffer for transferring a container, the buffer comprising:
- a first frame member having first and second vertical supports, wherein a first lift beam is disposed between and attached to the first and second vertical supports;
- a second frame member having third and fourth vertical supports, wherein a second lift beam, substantially parallel to the first lift beam, is disposed between and attached to the third and fourth vertical supports, and wherein the first and second frame members define a channel therebetween;
- a first set of support pads movably attached to the first lift beam;
- a second set of support pads movably attached to the second lift beam;
- a plurality of sensors connected to a program logic controller;
- a light signal adjacent the buffer and electrically connected to the program logic controller wherein the light signal illuminates in different colors based on the position of one of a chassis and the container in the channel; and
- a plurality of actuators connected to each set of the support pads and the program logic controller, said plurality of actuators capable of moving the support pads from a first position to a second position.

* * * * *